(12) United States Patent
Araki et al.

(10) Patent No.: US 10,288,475 B2
(45) Date of Patent: May 14, 2019

(54) ROTATING MACHINE ABNORMALITY DETECTION DEVICE, ROTATING MACHINE ABNORMALITY DETECTION METHOD, AND ROTATING MACHINE

(71) Applicant: Kobe Steel, Ltd., Hyogo (JP)

(72) Inventors: Kaname Araki, Kobe (JP); Eiji Takahashi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 214 days.

(21) Appl. No.: 15/327,186

(22) PCT Filed: Aug. 18, 2015

(86) PCT No.: PCT/JP2015/073117
§ 371 (c)(1),
(2) Date: Jan. 18, 2017

(87) PCT Pub. No.: WO2016/039086
PCT Pub. Date: Mar. 17, 2016

(65) Prior Publication Data
US 2017/0184445 A1 Jun. 29, 2017

(30) Foreign Application Priority Data
Sep. 12, 2014 (JP) .................. 2014-185819

(51) Int. Cl.
*G01M 13/00* (2019.01)
*G01M 99/00* (2011.01)
*G01M 13/028* (2019.01)
*G01H 17/00* (2006.01)

(52) U.S. Cl.
CPC ............ *G01H 17/00* (2013.01); *G01M 13/00* (2013.01); *G01M 13/028* (2013.01); *G01M 99/00* (2013.01)

(58) Field of Classification Search
CPC ...... G01H 17/00; G01M 99/00; G01M 13/00; G01M 13/028
(Continued)

(56) References Cited

U.S. PATENT DOCUMENTS 4,884,449 A * 12/1989 Nishimoto .............. B21B 38/00
73/660
5,445,027 A * 8/1995 Zorner ................... G01N 29/14
73/593
(Continued)

FOREIGN PATENT DOCUMENTS

DE     102011055523     *  3/2013
JP         14048587     *  6/1987
(Continued)

OTHER PUBLICATIONS

Notification of Transmittal of Translation of the International Preliminary Report on Patentability (Chapter I) and Translation of Written Opinion of the International Searching Authority; PCT/JP2015/073117; dated Mar. 23, 2017.
(Continued)

*Primary Examiner* — Jacques M Saint Surin
(74) *Attorney, Agent, or Firm* — Studebaker & Brackett PC (57) ABSTRACT

An abnormality detecting apparatus (10) for a rotating machine includes: a calculating part (15) which calculates a phase difference between signals respectively output from two sensors of one or more sets, the one or more sets being predetermined combinations of two sensors among the plurality of sensors, the plurality of sensors each of which detects an elastic wave generating in the rotating machine (1) having a rotor during rotation of the rotor, the sensors being arranged at predetermined different locations of the rotating machine (1); a storing part (16) which stores in advance information concerning a relationship between a
(Continued)

phase difference and a contact position when a contact occurs during the rotation of the rotor, regarding the one or more sets; and a specifying part (17) which specifies a contact position by using a phase difference calculated by the calculating part (15) and the information stored in the storing part (16).

8 Claims, 12 Drawing Sheets

(58) Field of Classification Search
USPC .......................................................... 73/645
See application file for complete search history.

(56) References Cited

U.S. PATENT DOCUMENTS

| | | | |
|---|---|---|---|
| 5,557,552 A | | 9/1996 | Naito et al. |
| 2012/0253697 A1* | | 10/2012 | Frankenstein ..... G05B 23/0254 702/39 |
| 2017/0205276 A1* | | 7/2017 | Araki ..................... G01H 17/00 |
| 2017/0212085 A1* | | 7/2017 | Kajita ................... G01M 99/00 |

FOREIGN PATENT DOCUMENTS

| | | | |
|---|---|---|---|
| JP | S63-179222 A | | 7/1988 |
| JP | H05-231361 A | | 9/1993 |
| JP | H06-278419 A | | 10/1994 |
| JP | H09-133577 A | | 5/1997 |
| JP | 2001-074616 A | | 3/2001 |
| JP | 2009244090 | * | 10/2009 |
| JP | 2010-234403 A | | 10/2010 |
| JP | 005202012 B2 | * | 6/2013 |

OTHER PUBLICATIONS

International Search Report issued in PCT/JP2015/073117; dated Nov. 10, 2015.

The extended European search report issued by the European Patent Office dated Apr. 13, 2018, which corresponds to EP15840213.1-1001 and is related to U.S. Appl. No. 15/327,186.

* cited by examiner

|  | PHASE DIFFERENCE BETWEEN S1 AND S3 > 0 | PHASE DIFFERENCE BETWEEN S1 AND S3 = 0 | PHASE DIFFERENCE BETWEEN S1 AND S3 < 0 |
|---|---|---|---|
| PHASE DIFFERENCE BETWEEN S1 AND S2 > 0 | P1 | P4 | P7 |
| PHASE DIFFERENCE BETWEEN S1 AND S2 = 0 | P2 | P5 | P8 |
| PHASE DIFFERENCE BETWEEN S1 AND S2 < 0 | P3 | P6 | P9 |

ROTATING MACHINE ABNORMALITY DETECTION DEVICE, ROTATING MACHINE ABNORMALITY DETECTION METHOD, AND ROTATING MACHINE

TECHNICAL FIELD

The present invention relates to a technology of detecting an abnormality of a rotor included in a rotating machine.

BACKGROUND ART

Various technologies for diagnosing an abnormality inside a rotating machine (for example, a compressor, a motor, or a power generator) have been proposed. For example, there has been proposed a diagnosing method for a compressor of non-contact type in which an AE wave generated by a contact between a male rotor and a female rotor of the rotating machine during rotation of the rotors and rotational signals of the rotors are detected simultaneously to thereby perform diagnosis about a contact between the rotors on the basis of the detected AE signal and rotational signals, the method being characterized by amplifying and demodulating the AE signal, performing a frequency analysis and arithmetic mean processing to the output, and comparing the result with a determination reference on the basis of the rotational signals to perform diagnosis about a contact between the rotors or the like (for example, see Patent Literature 1).

Also, there has been proposed an irregular contact detecting method for detecting an irregular contact state in a rotating machine which includes a first rotor and a second rotor rotating in a pair, the method being characterized by demodulating an elastic wave signal output from the rotating machine, and determining that the rotors are in contact with each other if the demodulated elastic wave signal includes at least one of a rotational frequency component of the first rotor and a rotational frequency component of the second rotor at a predetermined level, determining that a rotor is in contact with the casing if the demodulated wave signal contains a frequency component obtained by multiplying the number of blades of the first rotor and the rotational frequency of the rotor, and a frequency component obtained by multiplying the number of blades of the second rotor and the rotational frequency of the rotor, and determining that a rotor is in contact with a sealing member if a wave level of the elastic wave signal output from the rotating machine is larger than a predetermined level, but the mutual contact between the rotors and the contact between a rotor and the casing are not determined (see, Patent Literature 2).

Further, there has been proposed an abnormality diagnosing apparatus in which an oscillation of a rotating machine is detected and then applied with a continuous wavelet transform, the transformed signal is added in a frequency axis direction, and a is determined based on the result of the addition (for example, see Patent Literature 3).

CITATION LIST

Patent Literature

Patent Literature 1: Japanese Unexamined Patent Publication No. HEI 5-231361
Patent Literature 2: Japanese Unexamined Patent Publication No. HEI 9-133577
Patent Literature 3: Japanese Unexamined Patent Publication No. 2001-74616

SUMMARY OF INVENTION

For example, the technology of Patent Literature 2 can determine a contact between rotors, a contact between a rotor and a casing, and a contact between a rotor and a sealing member distinguishingly from one another. It will be seen to be more useful in the maintenance that respective specified positions of these contacts can be attained.

The present invention has an object of providing a technology which makes it possible to specify a contact position when a rotor contact occurs during rotation thereof.

An abnormality detecting apparatus for a rotating machine according to one aspect of the present invention includes: a plurality of sensors each of which detects an elastic wave generating in the rotating machine having a rotor during rotation of the rotor, the plurality of sensors being arranged at predetermined a plurality of different locations of the rotating machine; a calculating part which calculates a phase difference between signals respectively output front two sensors of one or more sets, the one or more sets being predetermined combinations of two sensors among the plurality of sensors; a storing part which stores in advance information concerning a relationship between the phase difference and a contact position when a contact occurs during the rotation of the rotor, regarding the one or more sets; and a specifying part which specifies the contact position by using the phase difference calculated by the calculating part and the information stored in the storing part.

The present invention can specify a contact position when a rotor contact occurs during rotation thereof.

DESCRIPTION OF EMBODIMENTS

Figure 1:
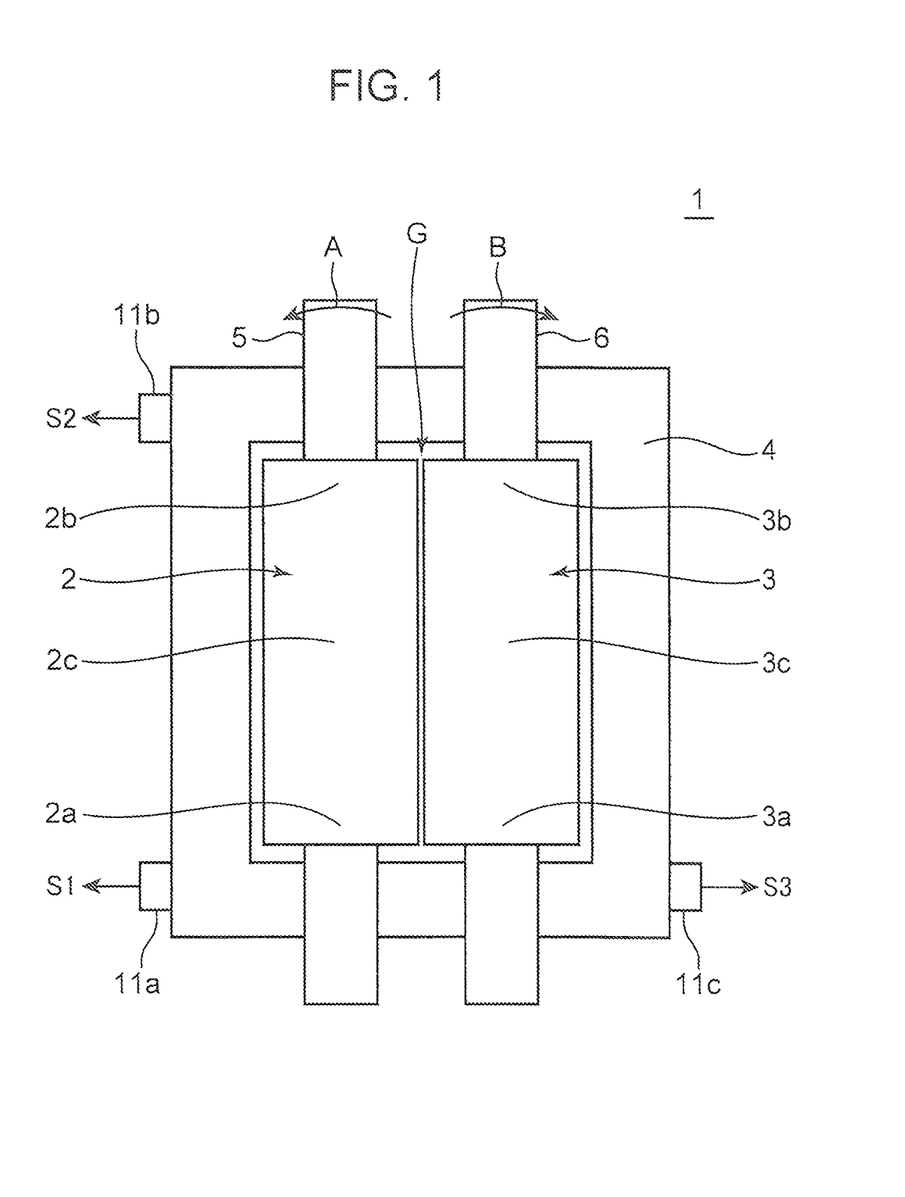
FIG. 1 is a schematic view showing an exemplary rotating machine.

Hereinafter, an embodiment of the present invention will be described with reference to the accompanying drawings. FIG. 1 is a schematic view showing an exemplary rotating machine 1. The rotating machine 1 includes a first rotor 2, a second rotor 3 arranged against the first rotor 2 at a predetermined gap G, and a casing 4 for accommodating the first rotor 2 and the second rotor 3.

The first rotor 2 has a rotary shaft 5, and is driven to rotate about the rotary shaft 5 in the direction of arrow A (for example, a counterclockwise direction). The second rotor 3 has a rotary shaft 6, and is driven to rotate about the rotary shaft 6 in the direction of arrow B (for example, a clockwise direction)

Three sensors 11a, 11b, 11c are attached to an outer wall of the casing 4. The sensors 11a, 11b, 11c respectively detect elastic waves generating in the rotating machine 1, and output signals S1, S2, S3 each representing an intensity and time relationship of the elastic wave. The elastic wave means, for example, an oscillatory wave or an ultrasonic wave.

The sensor 11a is located close to one end portion 2a of the first rotor 2. The sensor 11b is located close to the other end portion 2b of the first rotor 2. The sensor 11c is located close to one end portion 3a of the second rotor 3. In this way, the sensors 11a, 11b, 11c are arranged at predetermined different locations of the rotating machine 1 including the rotors, and respectively detect elastic waves generating in the rotating machine 1 during the rotation of the rotors. Moreover, the locations where the sensors 11a, 11b, 11c are attached are not limited to the aforementioned ones. In the present embodiment, the three sensors 11a, 11b, 11c are exemplified as the plurality of sensors for explanation. However, it may be sufficient to provide at least two sensors.

Figure 2:
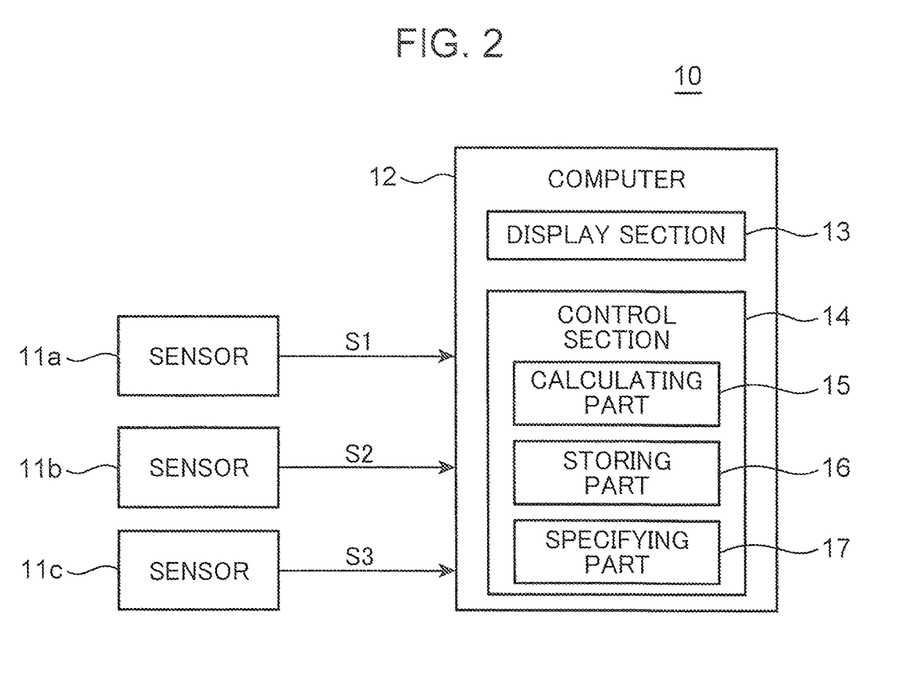
FIG. 2 is a block diagram showing a configuration of an abnormality detecting apparatus for a rotating machine according to the present embodiment.

FIG. 2 is a block diagram showing a configuration of a rotating machine abnormality detecting apparatus 10 according to the present embodiment. The rotating machine abnormality detecting apparatus 10 includes the sensors 11a, 11b, 11c, and a computer 12.

It may be appreciated that each of the sensors 11a, 11b, 11c detects an elastic wave generated by a contact of the first rotor 2 or the second rotor 3 with a certain member. When an ultrasonic wave generated by a contact is detected as an elastic wave, an AE (Acoustic Emission) sensor is used. When an oscillation generated by a contact is detected as an elastic wave, an oscillation sensor is used. In the present embodiment, the AE sensor is exemplified as each of the sensors 11a, 11b, 11c.

The computer 12 includes a display section 13 and a control section 14. The display section 13 includes a display device such as a liquid crystal panel. The control section 14 has a CPU (Central Processing Unit), a ROM (Read Only Memory), and a RAM (Random Access Memory). The ROM stores various types of programs and software to execute detecting an abnormality in the rotating machine 1.

The control section 14 includes such function blocks as a calculating part 15, a storing part 16, and a specifying part 17. These blocks will be described later.

The calculating part 15 calculates a phase difference between signals respectively output from two sensors of one or more sets. The one or more sets of combinations of two sensors are predetermined among the sensors 11a, 11b, 11c. In the present embodiment, one set of the sensor 11a and the sensor 11b, and another set of the sensor 11a and the sensor 11c are exemplified. However, the set is not limited thereto. When two sensors are used, only one set can be made.

Arrangement locations of the sensors in the rotating machine 1, the number of sensors, and the number of sets each including two sensors are determined in advance by a maker or other person of the rotating machine abnormality detecting apparatus 10 depending on an actual situation of abnormality detection for the rotating machine 1.

Figure 3:
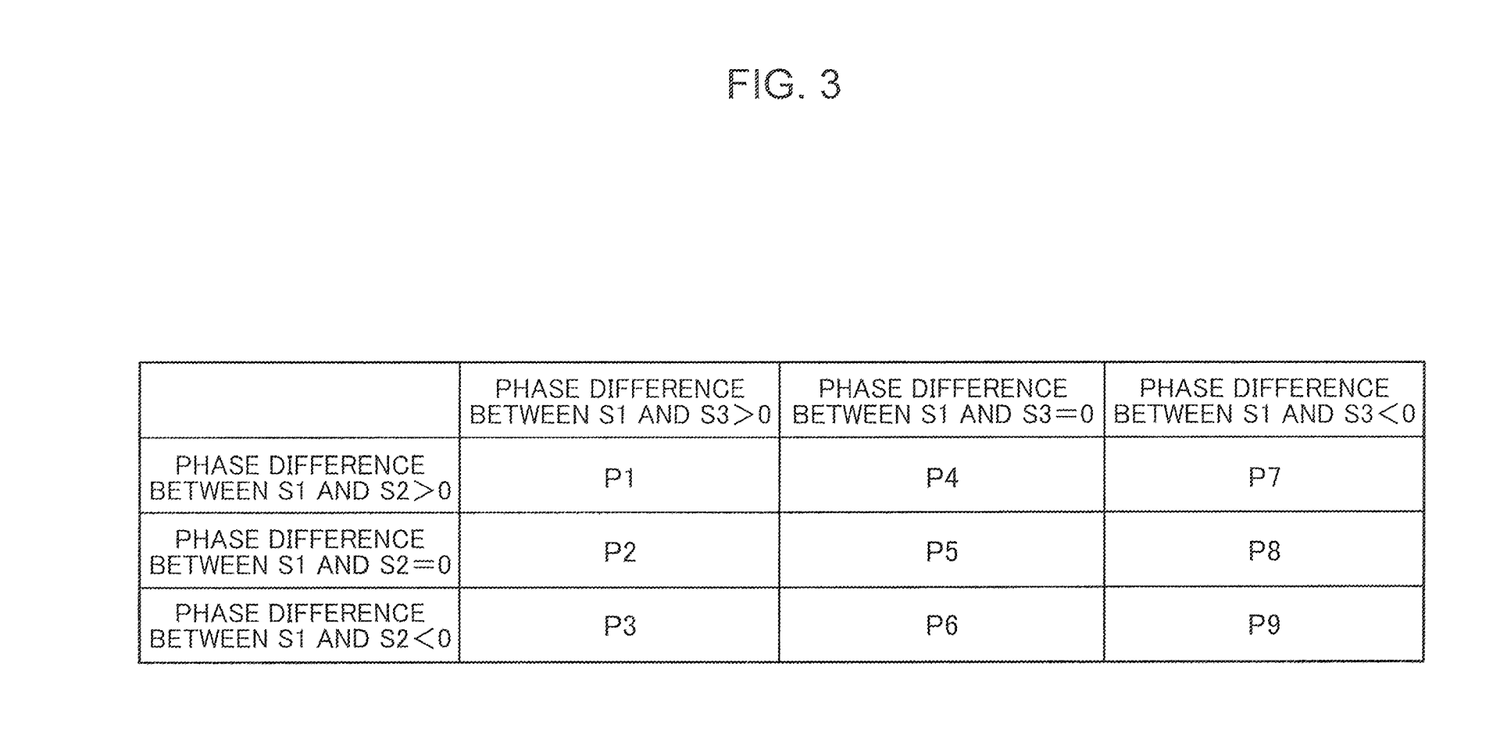
FIG. 3 is a table showing exemplary information concerning a relationship between a phase difference and a contact position.

The storing part 16 stores in advance information concerning a relationship between a phase difference and a contact position when a contact occurs during the rotation of the first rotor 2 and the second rotor 3, regarding each set. FIG. 3 is a table showing exemplary information. Details of the table will be described later.

Figure 4:
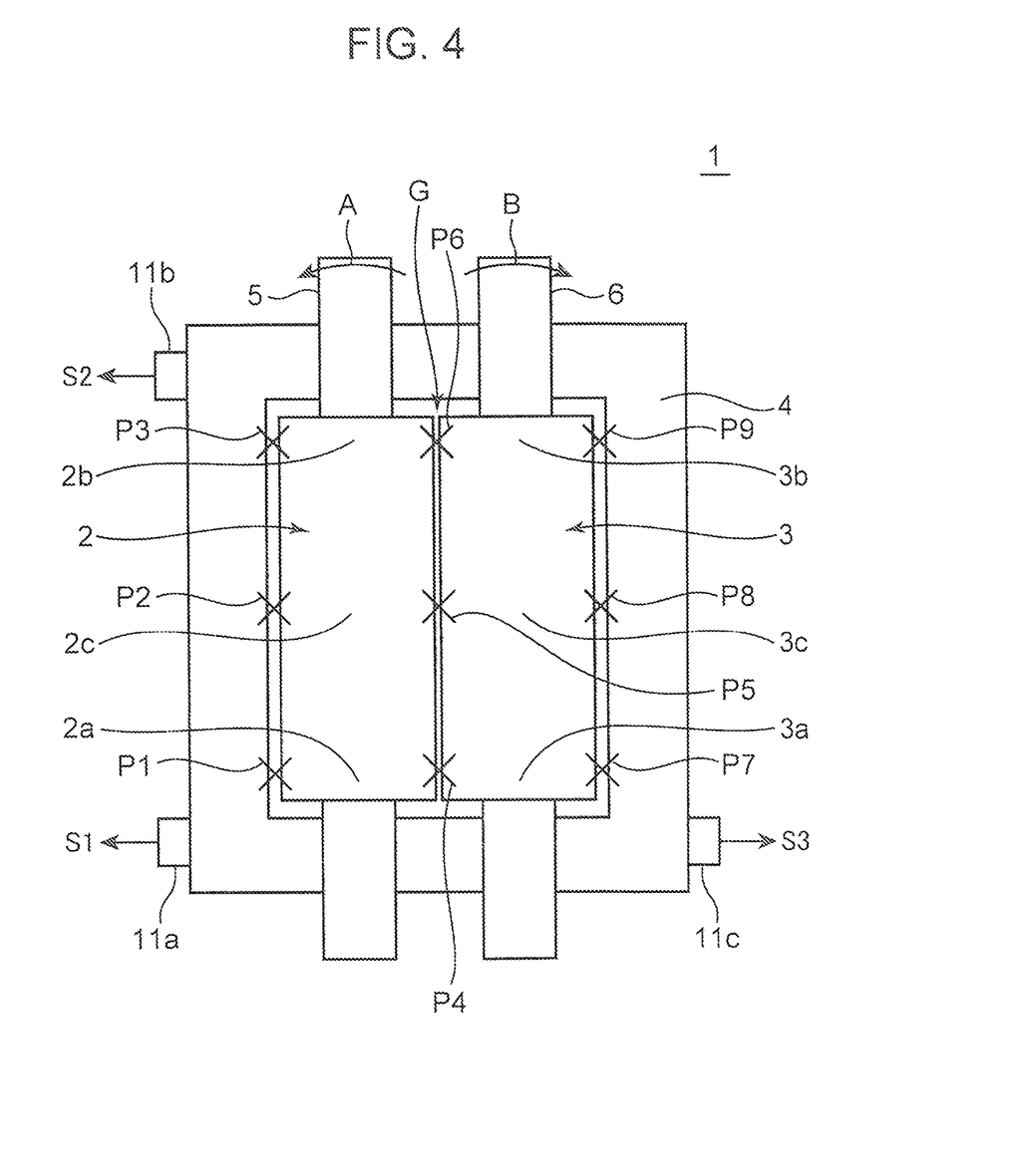
FIG. 4 is a schematic view showing exemplary contact positions of rotors in the rotating machine shown in FIG. 1.

FIG. 4 is a schematic view showing exemplary contact positions of the rotors in the rotating machine 1 shown in FIG. 1. It is presumed that a contact occurs between the first rotor 2 and the casing 4 by each rotation of the first rotor 2, a contact occurs between the second rotor 3 and the casing 4 by each rotation of the second rotor 3, and a contact occurs between the first rotor 2 and the second rotor 3 by each rotation of the first rotor 2.

A contact position P1 represents a position where the first rotor 2 and the casing 4 are in contact with each other on the one end portion 2a of the first rotor 2. A contact position P2 represents a position where the first rotor 2 and the casing 4 are in contact with each other on a center portion 2c of the first rotor 2. A contact position P3 represents a position where the first rotor 2 and the casing 4 are in contact with each other on the other end portion 2b of the first rotor 2.

A contact position P4 represents a position where the first rotor 2 and the second rotor 3 are in contact with each other between the one end portion 2a of the first rotor 2 and the one end portion 3a of the second rotor 3. A contact position P5 represents a position where the first rotor 2 and the second rotor 3 are in contact with each other between the center portion 2c of the first rotor 2 and a center portion 3c of the second rotor 3. A contact position P6 represents a position where the first rotor 2 and the second rotor 3 are in contact with each other between the other end portion 2b of the first rotor 2 and the other end portion 3b of the second rotor 3.

A contact position P7 represents a position where the second rotor 3 and the casing 4 are in contact with each other on the one end portion 3a of the second rotor 3. A contact position P8 represents a position where the second rotor 3 and the casing 4 are in contact with each other on the center portion 3c of the second rotor 3. A contact position P9 represents a position where the second rotor 3 and the casing 4 are in contact with each other in the other end portion 3b of the second rotor 3.

Figure 5:
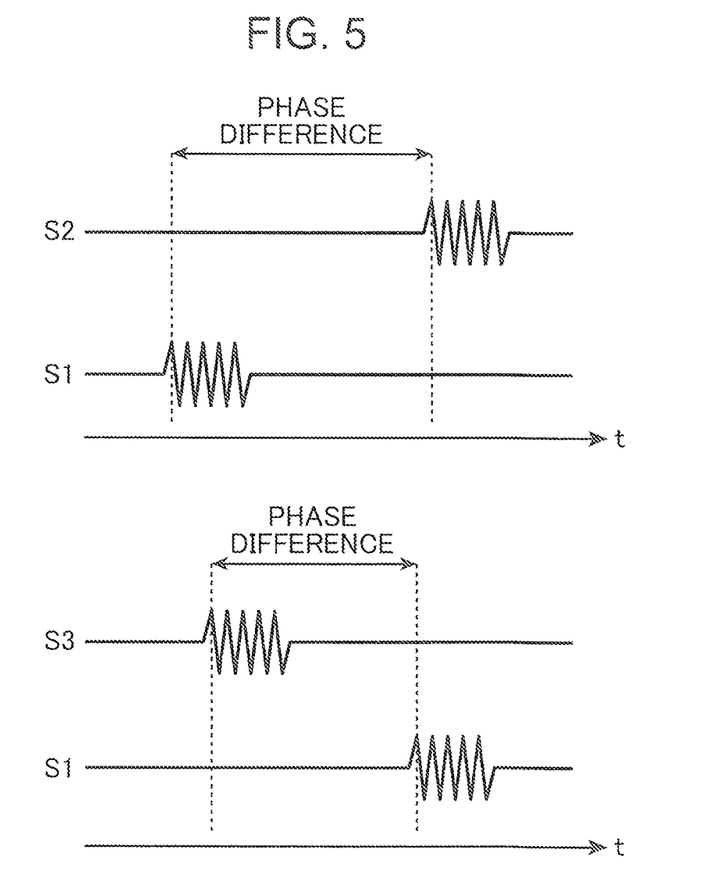
FIG. 5 is a graph schematically showing a phase relationship between a signal S1 output from one sensor and a signal S2 output from another sensor of one set, and a phase relationship between a signal S1 output from one sensor and a signal S3 output from another sensor of another set.

FIG. 5 is a graph schematically showing an exemplary phase relationship between a signal S1 output from the sensor 11a and a signal S2 output from the sensor 11b, and another exemplary phase relationship between a signal S1 output from the sensor 11a and a signal S3 output from the sensor 11c. The waveforms of the signals S1, S2, S3 are merely shown as a model, and do not mean actual waveforms of the signals S1, S2, S3 respectively output from the sensors 11a, 11b, and 11c. An inconstant fluctuation in the waveform represents detection of a contact with respect to the remaining portion of the waveform that means no occurrence of a contact.

If the fluctuation in the waveform of the signal S2 that varies in the same manner as the fluctuation in the waveform of the signal S1 delays than the fluctuation in the waveform of the signal S1, a phase difference between the signal S1 and the signal S2 is greater than 0, and if the fluctuation of the signal S2 advances than the fluctuation in the waveform of the signal S1, a phase difference between the signal S1 and the signal S2 is smaller than 0.

If the fluctuation in the waveform of the signal S3 that varies in the same manner as the fluctuation in the waveform of the signal S1 delays than the fluctuation in the waveform of the signal S1, a phase difference between the signal S1 and the signal S3 is greater than 0, and if the fluctuation of the signal S3 advances than the fluctuation in the waveform of the signal S1, a phase difference between the signal S1 and the signal S3 is smaller than 0.

According to FIGS. 3 to 5, the distance between the sensor 11a and the contact position P1 is shorter than the distance between the sensor 11b and the contact position P1. The distance between the sensor 11a and the contact position P4 is shorter than the distance between the sensor 11b and the contact position P4. The distance between the sensor 11a and the contact position P7 is shorter than the distance between the sensor 11b and the contact position P7. In this case, the fluctuation in the waveform of the signal S2 delays than the fluctuation in the waveform of the signal S1, and thus a phase difference between the signal S1 and the signal S2 becomes greater than 0.

The distance between the sensor 11a and the contact position P2 is the same as the distance between the sensor 11b and the contact position P2. The distance between the sensor 11a and the contact position P5 is the same as the distance between the sensor 11b and the contact position P5. The distance between the sensor 11a and the contact position P8 is the same as the distance between the sensor 11b and the contact position P8. In this case, the fluctuation in the waveform of the signal S1 and the fluctuation in the waveform of the signal S2 have the same phase, and thus a phase difference between the signal S1 and the signal S2 becomes 0.

The distance between the sensor 11a and the contact position P3 is longer than the distance between the sensor 11b and the contact position P3. The distance between the sensor 11a and the contact position P6 is longer than the distance between the sensor 11b and the contact position P6. The distance between the sensor 11a and the contact position P9 is longer than the distance between the sensor 11b and the contact position P9. In this case, the fluctuation in the waveform of the signal S2 advances than the fluctuation in the waveform of the signal S1, and thus a phase difference between the signal S1 and the signal S2 becomes smaller than 0.

The distance between the sensor 11a and the contact position P1 is shorter than the distance between the sensor 11c and the contact position P1. The distance between the sensor 11a and the contact position P2 is shorter than the distance between the sensor 11c and the contact position P2. The distance between the sensor 11a and the contact position P3 is shorter than the distance between the sensor 11c and the contact position P3. In this case, the fluctuation in the waveform of the signal S3 delays than the fluctuation in the waveform of the signal S1, and thus a phase difference between the signal S1 and the signal S3 becomes greater than 0.

The distance between the sensor 11a and the contact position P4 is the same as the distance between the sensor 11c and the contact position P4. The distance between the sensor 11a and the contact position P5 is the same as the distance between the sensor 11c and the contact position P5. The distance between the sensor 11a and the contact position P6 is the same as the distance between the sensor 11c and the contact position P6. In this case, the fluctuation in the waveform of the signal S1 and the fluctuation in the wave- form of the signal S3 have the same phase, and thus a phase difference between the signal S1 and the signal S3 becomes 0.

The distance between the sensor 11a and the contact position P7 is longer than the distance between the sensor 11c and the contact position P7. The distance between the sensor 11a and the contact position P8 is longer than the distance between the sensor 11c and the contact position P8. The distance between the sensor 11a and the contact position P9 is longer than the distance between the sensor 11c and the contact position P9. In this case, the fluctuation in the waveform of the signal S3 advances than the fluctuation in the waveform of the signal S1, and thus a phase difference between the signal S1 and the signal S3 becomes smaller than 0.

FIG. 3 is a table which is made on the basis of the above-described relationships. In the present embodiment, a contact position is specified by each combination between the case where the phase difference between the signal S1 and the signal S2 is greater than 0, is 0, or is smaller than 0, and the case where the phase difference between the signal S1 and the signal S3 is greater than 0, is 0 or is smaller than 0. However, the specifying way is not limited thereto. A contact position may be specified by using a value of a phase difference between the signal S1 and the signal S2, and a value of a phase difference between the signal S1 and the signal S3.

The specifying part 17 shown in FIG. 2 specifies a contact position by using a phase difference calculated by the calculating part 15 and the information stored in the storing part 16.

For the calculation of a phase difference by the calculating part 15, there are four ways which will be described below. The ways which will be described below are directed to calculation of a phase difference between the signal S1 and the signal S2, but it should be noted that a phase difference between the signal S1 and the signal S3 can be calculated by the same ways as well.

<First Way of Calculating Phase Difference>

Figure 6:
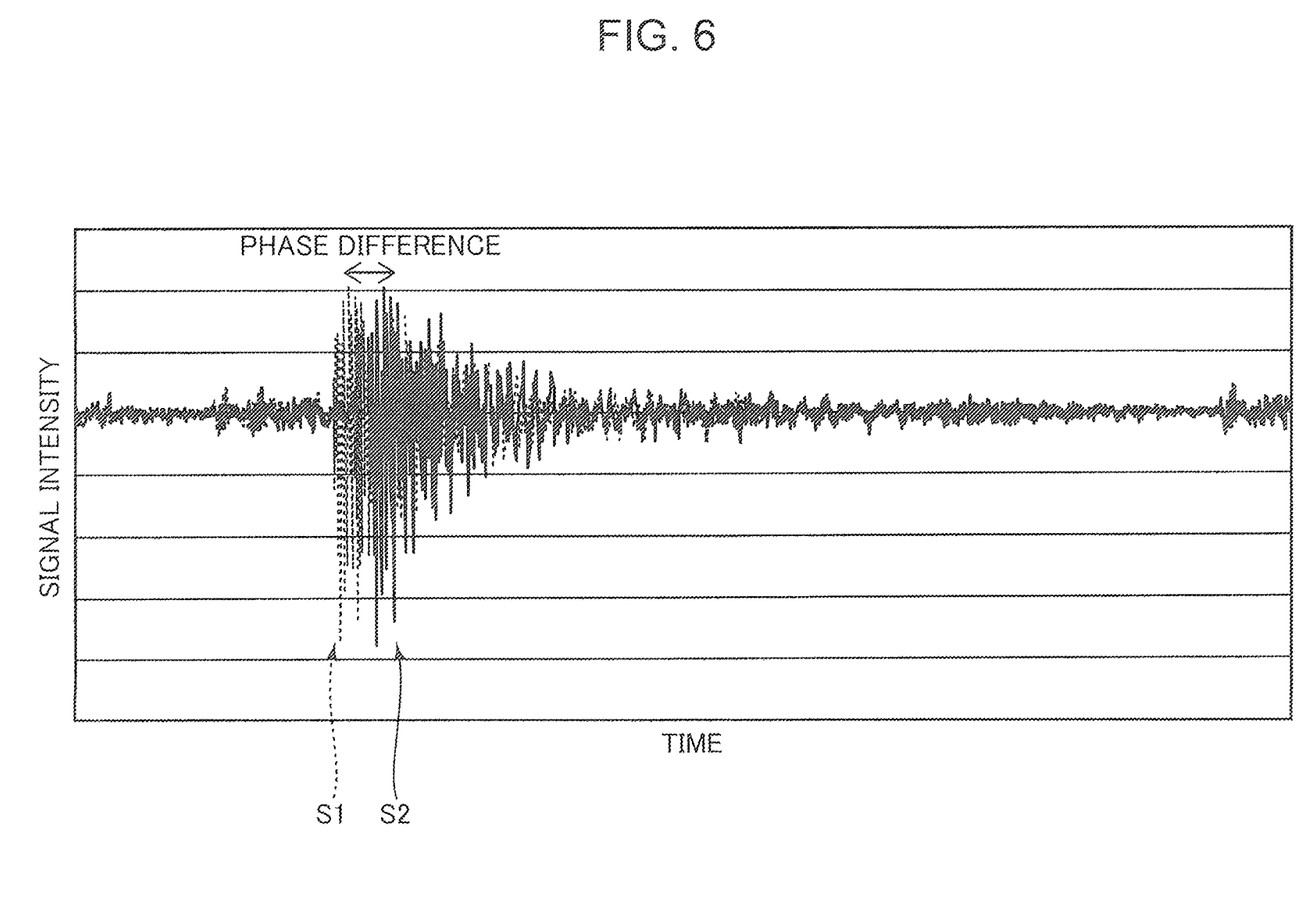
FIG. 6 is a graph showing an exemplary time and signal-intensity relationship of signals S1 and S2.

FIG. 6 is a graph showing an exemplary time and signal-intensity relationship of the signals S1 and S2. The lateral axis indicates the time, and the vertical axis indicates the signal intensity. The calculating part 15 calculates a phase difference between a phase of the signal S1 having a value exceeding a predetermined threshold value T and a phase of the signal S2 having a value exceeding the predetermined threshold value T.

<Second Way of Calculating Phase Difference>

The calculating part 15 calculates a shift difference, i.e. phase difference, between the signal S1 and the signal S2 by using a cross-correlation function between the signal S1 and the signal S2. According to the cross-correlation function, one of the signals S1 and S2 is shifted in the time axis direction until the two signals S1 and S2 match. The amount of the shift represents the phase difference. The second way using the cross-correlation function makes it possible to calculate a phase difference more accurately than the first way.

<Third Way of Calculating Phase Difference>

A large oscillation peculiar to the rotating machine 1 will lead to a noise, and hence it is impossible to accurately calculate a phase difference even by using the cross-correlation function. In this case, a third way is adopted. The calculating part 15 calculates an image difference, i.e. phase difference, by performing a time-frequency analysis to the signal S1 and the signal S2 respectively, and using a two-dimensional cross-correlation function between images obtained by the time-frequency analysis. The third way makes it possible to decrease noise influence. Further, the calculating part 15 uses a short-time Fourier transform or a wavelet transform as the time-frequency analysis.

Figure 7A:
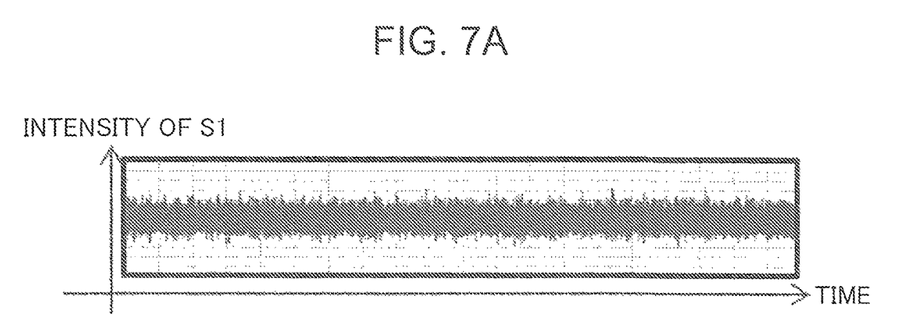
FIG. 7A is a graph showing an exemplary function representing a time and intensity relationship of a signal S1.
Figure 7B:
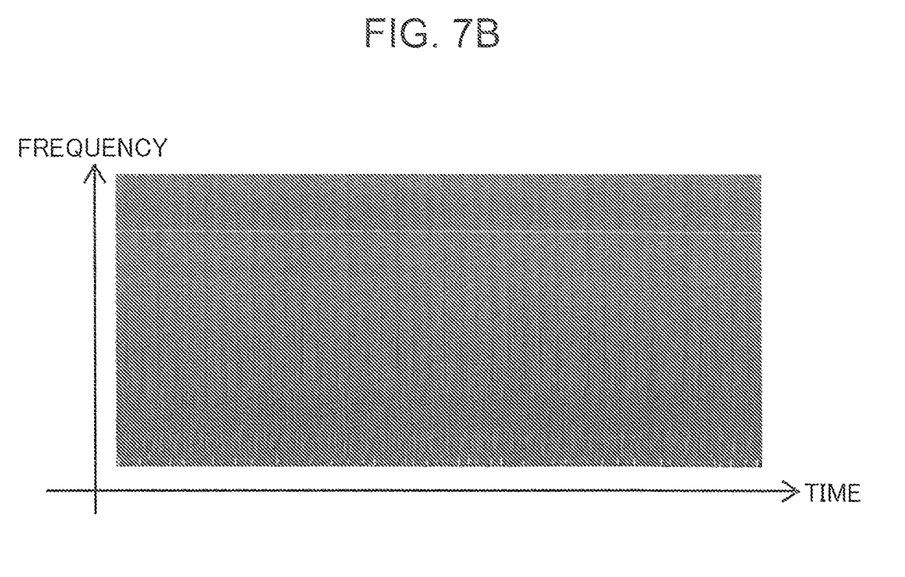
FIG. 7B is a graph showing exemplary data obtained by performing a time-frequency analysis to the signal S1.

Each of the two images has a two dimension, and hence the cross-correlation function between the two images is the two-dimensional cross-correlation function. Specifically, FIG. 7A is a graph showing an exemplary function representing a time and signal S1-intensity relationship of the signal S1. The lateral axis indicates the time, and the vertical axis indicates the intensity of the signal S1. FIG. 7B is a graph showing exemplary data obtained by performing the time-frequency analysis to the signal S1. The lateral axis indicates the time, and the vertical axis indicates the frequency.

Figure 7C:
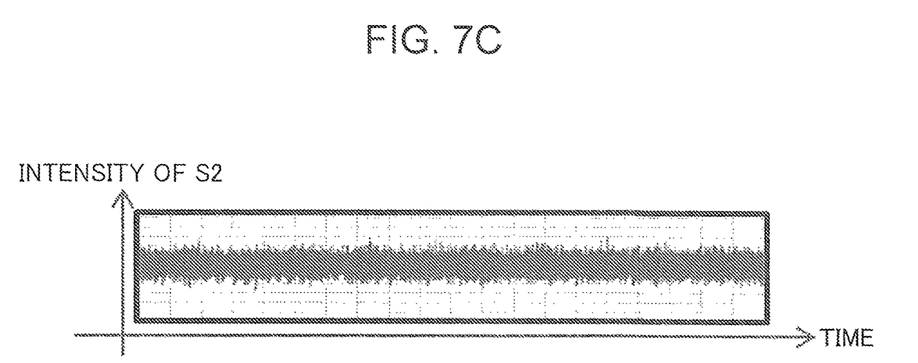
FIG. 7C is a graph showing an exemplary function representing a time and intensity relationship of a signal S2.
Figure 7D:
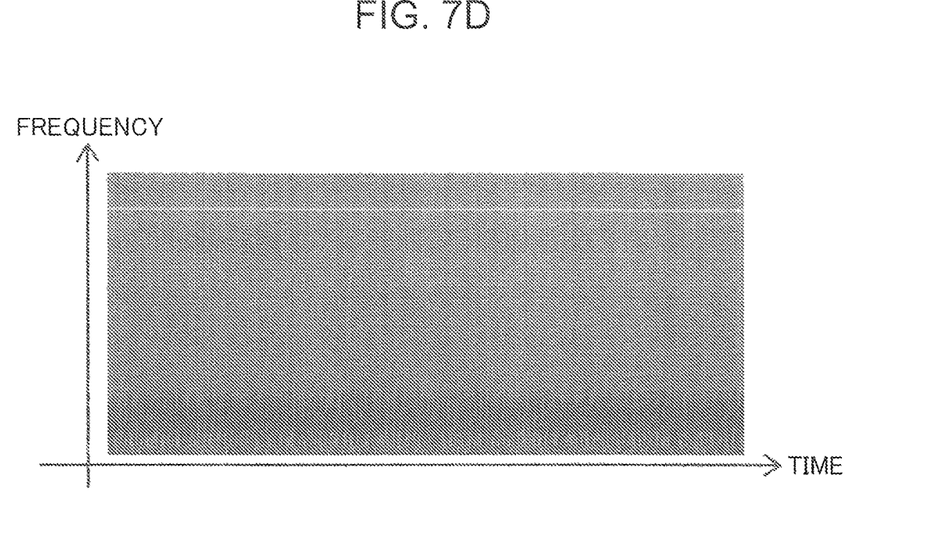
FIG. 7D is a graph showing exemplary data obtained by performing the time-frequency analysis to the signal S2.

FIG. 7C is a graph showing an exemplary function representing a time and signal S2-intensity relationship of the signal S2. The lateral axis indicates the time, and the vertical axis indicates the intensity of the signal S2. FIG. 7D is a graph showing exemplary data obtained by performing the time-frequency analysis to the signal S2. The lateral axis indicates the time, and the vertical axis indicates the frequency. The images obtained by the time-frequency analysis mean graph images each representing a time and frequency relationship as shown in FIGS. 7B and 7D.

In FIGS. 7B and 7D, white segments indicate frequency components having a high intensity, and gray segments indicate frequency components having a low intensity. It is understood that low frequency components have an increased intensity. This means that the low frequency components contain many noises caused by an oscillation peculiar to the rotating machine 1.

The graph in FIG. 7B shows an image obtained by performing the time-frequency analysis to the signal S1, and the graph in FIG. 7D shows an image obtained by performing the time-frequency analysis to the signal S2. The calculating part 15 calculates a phase difference by using the two-dimensional cross-correlation function between the image shown in FIG. 7B and the image shown in FIG. 7D.

<Fourth Way of Calculating Phase Difference>

A fourth way is adopted when it is required to calculate a phase difference more accurately than the third way. The calculating part 15 calculates an image difference, i.e. phase difference, by performing the time-frequency analysis to the signals S1, S2, and using a two-dimensional phase-only correlation function between images obtained by the time-frequency analysis. The calculating part 15 uses a short-time Fourier transform or a wavelet transform as the time-frequency analysis.

The calculation of a phase difference in accordance with the fourth way will be described in detail. The calculating part 15 calculates a phase-only correlation function, as defined by the following formulas, between the data (i.e. a two dimensional signal $f(n_1, n_2)$ representing a time and frequency relationship) shown in FIG. 7B and the data (i.e. a two dimensional signal $g(n_1, n_2)$ representing a time and frequency relationship) shown in FIG. 7D.

$$\hat{r}(k_1, k_2) = \frac{1}{N_1 N_2} \sum_{k_1=-M_1}^{M_1} \sum_{k_2=-M_2}^{M_2} \hat{R}(k_1, k_2) W_{N_1}^{-k_1 n_1} W_{N_2}^{-k_2 n_2} \quad \text{[Formula 1]}$$

$$F(k_1, k_2) = \sum_{n_1=-M_1}^{M_1} \sum_{n_2=-M_2}^{M_2} f(n_1, n_2) W_{N_1}^{k_1 n_1} W_{N_2}^{k_2 n_2} =$$

$$A_F(k_1, k_2) e^{j\theta_F(k_1, k_2)}$$

-continued $$G(k_1, k_2) = \sum_{n_1=-M_1}^{M_1} \sum_{n_2=-M_2}^{M_2} g(n_1, n_2) W_{N_1}^{k_1 n_1} W_{N_2}^{k_2 n_2} =$$

$$A_G(k_1, k_2) e^{j\theta_G(k_1, k_2)}$$

$$\hat{R}(k_1, k_2) = \frac{F(k_1, k_2)\overline{G}(k_1, k_2)}{|F(k_1, k_2)\overline{G}(k_1, k_2)|} e^{j\theta(k_1, k_2)}$$

Figure 8:
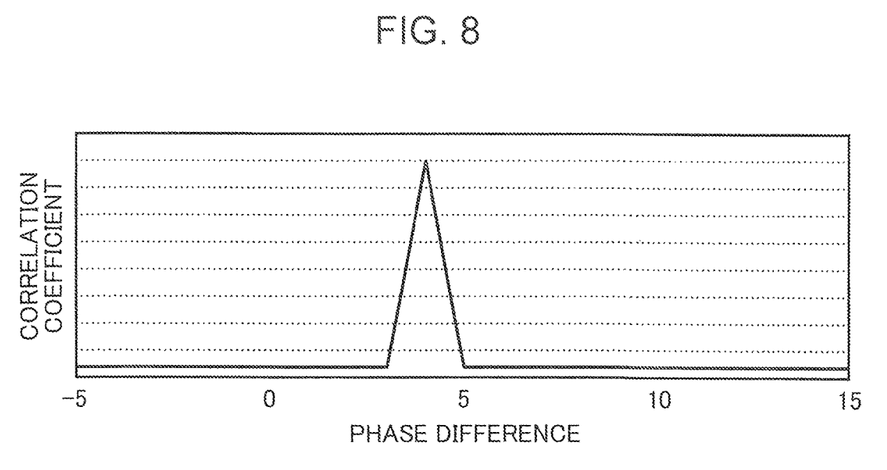
FIG. 8 is a graph showing an exemplary phase-only correlation function calculated by a calculating part.

[Formula 2]
r: phase-only correlation function
$k_1 = -M_1, \ldots, M_1$
$k_2 = -M_2, \ldots, M_2$
$W_{N1} = e^{-j2\pi/N1}$
$W_{N2} = e^{-j2\pi/N2}$
F: two-dimensional discrete Fourier transform to the first data
G: two-dimensional discrete Fourier transform to the second data
R: function representing a phase difference between F and G
$A_F(k_1, k_2)$: amplitude of F $(k_1, k_2)$
$A_G(k_1, k_2)$: amplitude of G $(k_1, k_2)$
$e^{j\theta_F}(k_1, k_2)$: phase
$e^{j\theta_G}(k_1, k_2)$: phase FIG. 8 is a graph showing an exemplary phase-only correlation function calculated by the calculating part 15. The lateral axis indicates the phase difference, and the vertical axis indicates the correlation function. The phase difference having a peak correlation coefficient means a phase difference between the signal S1 and the signal S2.

As described above, the lower frequency component is likely to contain many noises in the data shown in FIG. 7B and the data shown in FIG. 7D. Hence, it is appreciated to calculate a phase-only correlation function by using only a component having a high frequency and containing fewer noises (for example, 150 kHz or more).

Figure 9:
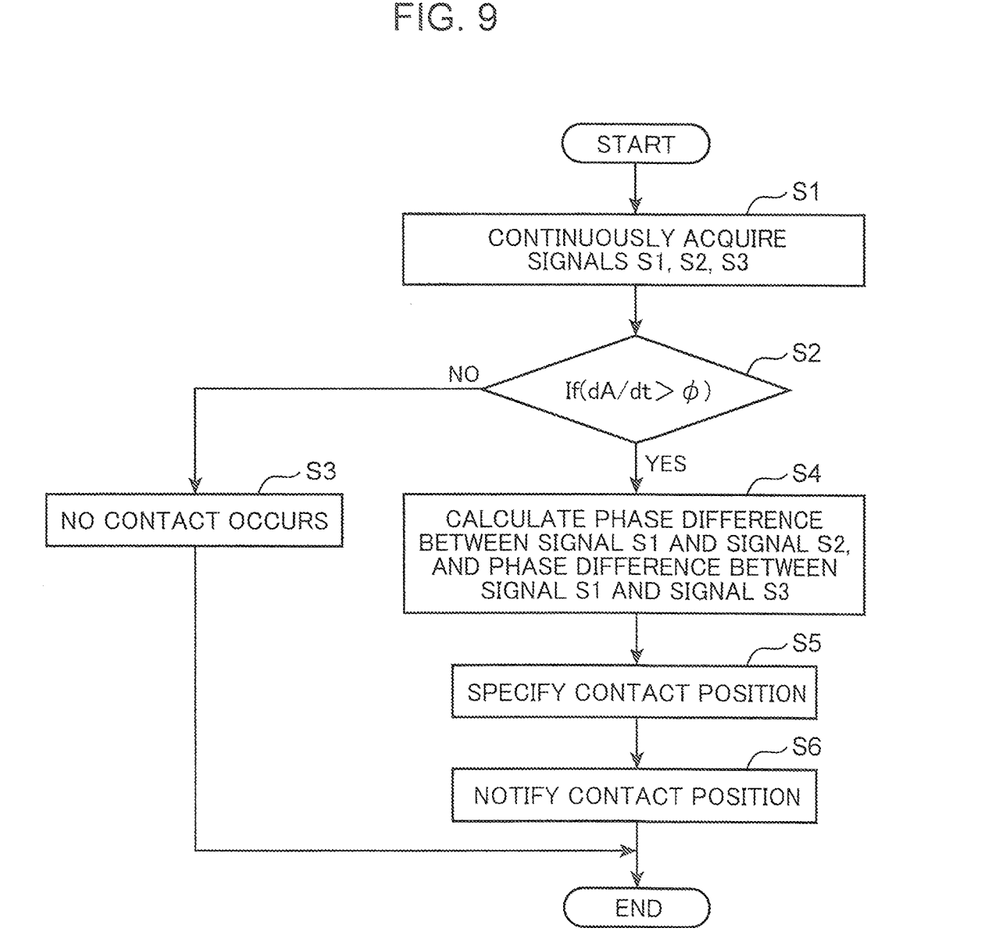
FIG. 9 is a flowchart explaining an operation of the abnormality detecting apparatus for a rotating machine according to the present embodiment.

An operation of the rotating machine abnormality detecting apparatus 10 according to the present embodiment will be described mainly with reference to FIGS. 1, 2 and 9. FIG. 9 shows a flowchart explaining the operation. The signals S1, S2, S3 respectively output from the sensors 11a, 11b, 11c are continuously transmitted to the computer 12 during the rotation of the first rotor 2 and the second rotor 3, and the control section 14 continuously acquires the signals S1, S2, S3 (step S1).

Each intensity of the signals S1, S2, S3 varies in a wide range of frequency bands at a beginning of each of the contacts between the first rotor 2 and the casing 4, between the first rotor 2 and the second rotor 3, and between the second rotor 3 and the casing 4. By utilizing these variations, a contact time is specified to be a time when time based variation of, for example, the intensity of the signal S1 among the signals S1, S2, S3 simultaneously occurs in a plurality of frequency bands. In other words, a contact time is specified to be a time at which a value obtained by differentiating a function A (t) representing the signal S1 by time is larger than a predetermined threshold value ϕ.

The control section 14 judges whether or not there is an occasion where the value obtained by differentiating the function A(t) representing the signal S1 acquired in step S1 by time is larger than the predetermined threshold value ϕ (step S2). It should be noted that the contact time is specified in order to reduce the calculation amount (for example, calculation amount of the time-frequency analysis) of the calculating part. Hence, the specifying of the contact time is not indispensable processing to specify the contact positions P1 to P9.

When the control section 14 judges that there is no occasion where the value obtained by differentiating the function A(t) by time is larger than the threshold value φ (No in step S2), the control section 14 determines that no contact occurs (step S3).

When the control section 14 judges that there is the occasion where the value obtained by differentiating the function A(t) by time is larger than the threshold value φ (Yes in step S2), the calculating part 15 calculates a phase difference between the signal S1 and the signal S2, and a phase difference between the signal S1 and the signal S3 about the portions of each of the signals S1, S2, S3 respectively output from the sensors 11a, 11b, 11c that lie before and after the occasion, mainly, after the occasion (step S4).

The specifying part 17 specifies a contact position by using a phase difference between the signal S1 and the signal S2 and a phase difference between the signal S1 and the signal S3 as calculated in step S4, and further using the table shown in FIG. 3 (step S5). And, the control section 14 notifies the contact position by using the display section 13 (step S6).

Significant advantageous effects of the present embodiment will be described. When a rotor (the first rotor 2, the second rotor 3) comes into contact with a certain member during rotation thereof, an elastic wave (such as an ultrasonic wave or an oscillatory wave) generates. In this case, a phase difference between signals respectively output from two sensors arranged at different locations of the rotating machine 1 differs depending on a contact position of the rotor. The rotating machine abnormality detecting apparatus 10 according to the present embodiment specifies a contact position by utilizing such a phase difference.

The rotating machine abnormality detecting apparatus 10 according the present embodiment uses the three sensors 11a, 11b, 11c. However, it is appreciated to provide a plurality of sensors, for example, a configuration adopting two sensors may be appreciated. In this configuration, a first sensor is attached to a casing 4, and a second sensor is attached to a rotating machine 1 with a predetermined distance from the casing 4. If a phase of a signal output from the first sensor advances than a phase of a signal output from the second sensor, it can be judged that an oscillation has been directly propagated from the casing 4 to the first sensor and the second sensor. In this manner, the rotating machine abnormality detecting apparatus according to the present embodiment calculates a phase difference between the signal output from the first sensor and the signal output from the second sensor, and determines that a contact occurs between the first rotor 2 and the casing 4 or between the second rotor 3 and the casing 4, if the phase of the signal output from the first sensor advances than the phase of the signal output from the second sensor.

In contrast, if the phase of the signal output from the first sensor delays than the phase of the signal output from the second sensor, it can be judged that an oscillation caused by a contact (i.e. a contact between the first rotor 2 and the second rotor 3) other than the above-described contacts has been propagated to the first sensor and the second sensor. In this manner, the rotating machine abnormality detecting apparatus according to the present embodiment determines that a contact occurs between the first rotor 2 and the second rotor 3, if the phase of the signal output from the first sensor delays than the phase of the signal output from the second sensor.

The rotating machine abnormality detecting apparatus 10 according to the present embodiment is applied to the rotating machine 1 including two rotors (the first rotor 2 and the second rotor 3), but may be adaptable to another rotating machine 1 including only a single rotor.

The rotating machine 1 for which abnormality detection is performed by the rotating machine abnormality detecting apparatus 10 according to the present embodiment includes a compressor, for example. However, the rotating machine 1 should not be limited to compressors.

SUMMARY OF THE PRESENT EMBODIMENT

An abnormality detecting apparatus for a rotating machine according to the first aspect includes: a plurality of sensors each of which detects an elastic wave generating in the rotating machine having a rotor during rotation of the rotor, the plurality of sensors being arranged at predetermined a plurality of different locations of the rotating machine; a calculating part which calculates a phase difference between signals respectively output from two sensors of one or more sets, the one or more sets being predetermined combinations of two sensors among the plurality of sensors; a storing part which stores in advance information concerning a relationship between the phase difference and a contact position when a contact occurs during the rotation of the rotor, regarding the one or more sets; and a specifying part which specifies the contact position by using the phase difference calculated by the calculating part and the information stored in the storing part.

When the rotor comes into contact with a certain member during rotation thereof, an elastic wave (such as an ultrasonic wave or an oscillatory wave) generates. In this case, a phase difference between the signals respectively output from the two sensors arranged at the different locations of the rotating machine differs depending on a contact position of the rotor. The abnormality detecting apparatus for a rotating machine according to the first aspect specifies a contact position by utilizing such a phase difference.

Arrangement locations of the sensors in the rotating machine, the number of sensors, and the number of sets each including two sensors are determined in advance by a maker or other person of the abnormality detecting apparatus for a rotating machine depending on an actual situation of abnormality detection for the rotating machine.

In this configuration, the calculating part calculates the phase difference by using a cross-correlation function between signals respectively output from the two sensors, regarding the one or more sets.

This configuration represents an exemplary way of calculating a phase difference.

In this configuration, the calculating part calculates the phase difference by performing a time-frequency analysis to signals respectively output from the two sensors, and using a two-dimensional cross-correlation function between graph images each representing a time and frequency relationship obtained by the time-frequency analysis, regarding the one or more sets.

A large oscillation peculiar to the rotating machine will lead to a noise. This configuration makes it possible to decrease noise influence, and hence a phase difference can be accurately calculated.

In this configuration, the calculating part calculates the phase difference by performing a time-frequency analysis to signals respectively output from the two sensors, and using a two-dimensional phase-only correlation function between graph images each representing a time and frequency relationship obtained by the time-frequency analysis, regarding the one or more sets.

This configuration makes it possible to calculate a phase difference more accurately than the configuration where a phase difference is calculated by using the two-dimensional cross-correlation function.

In this configuration, the calculating part uses a short-time Fourier transform or a wavelet transform as the time-frequency analysis.

This configuration represents an exemplary time-frequency analysis adaptable to the abnormality detecting apparatus for a rotating machine according to the first aspect.

An abnormality detecting method for a rotating machine according to the second aspect includes: a calculating step of calculating a phase difference between signals respectively output from two sensors of one or more sets, the one or more sets being predetermined combinations of two sensors among a plurality of sensors, the plurality of sensors each of which detects an elastic wave generating in the rotating machine having a rotor during rotation of the rotor, the plurality of sensors being arranged at predetermined a plurality of different locations of the rotating machine; a storing step of storing in advance information concerning a relationship between the phase difference and a contact position when a contact occurs during the rotation of the rotor, regarding the one or more sets before the calculating step; and a specifying step of specifying the contact position by using the phase difference calculated in the calculating step and the information stored in the storing step.

The abnormality detecting method for a rotating machine according to the second aspect makes it possible to specify a contact position for the same reasons described for the abnormality detecting apparatus for a rotating machine according to the first aspect.

A rotating machine according to the third aspect is a rotating machine including the above-described abnormality detecting apparatus.

The rotating machine according to the third aspect makes it possible to specify a contact position for the same reasons described for the abnormality detecting apparatus for a rotating machine according to the first aspect.

The invention claimed is:

1. An abnormality detecting apparatus for a rotating machine, comprising:
a plurality of sensors each of which detects an elastic wave generating in the rotating machine having a rotor during rotation of the rotor, the plurality of sensors being arranged at predetermined a plurality of different locations of the rotating machine;
a calculating part which calculates phase differences between signals respectively output from two sensors of sets exclusive of a single set, the sets being predetermined combinations of two sensors among the plurality of sensors;
a storing part which stores in advance information concerning a relationship between a combination of the phase differences and a contact position when a contact occurs during the rotation of the rotor, regarding the sets; and
a specifying part which specifies the contact position by using the combination of the phase differences calculated by the calculating part and the information stored in the storing part.

2. An abnormality detecting apparatus for a rotating machine according to claim 1, wherein
the calculating part calculates the phase differences by using a cross-correlation function between signals respectively output from the two sensors, regarding the sets.

3. An abnormality detecting apparatus for a rotating machine according to claim 1, wherein
the calculating part calculates the phase differences by performing a time-frequency analysis to signals respectively output from the two sensors, and using a two-dimensional cross-correlation function between graph images each representing a time and frequency relationship obtained by the time-frequency analysis, regarding the sets.

4. An abnormality detecting apparatus for a rotating machine according to claim 1, wherein
the calculating part calculates the phase differences by performing a time-frequency analysis to signals respectively output from the two sensors, and using a two-dimensional phase-only correlation function between graph images each representing a time and frequency relationship obtained by the time-frequency analysis, regarding the sets.

5. An abnormality detecting apparatus for a rotating machine according to claim 3, wherein
the calculating part uses a short-time Fourier transform or a wavelet transform as the time-frequency analysis.

6. An abnormality detecting apparatus for a rotating machine according to claim 4, wherein
the calculating part uses a short-time Fourier transform or a wavelet transform as the time-frequency analysis.

7. An abnormality detecting method for a rotating machine, comprising:
a calculating step of calculating phase differences between signals respectively output from two sensors of sets exclusive of a single set, the sets being predetermined combinations of two sensors among a plurality of sensors, the plurality of sensors each of which detects an elastic wave generating in the rotating machine having a rotor during rotation of the rotor, the plurality of sensors being arranged at predetermined a plurality of different locations of the rotating machine;
a storing step of storing in advance information concerning a relationship between a combination of the phase differences and a contact position when a contact occurs during the rotation of the rotor, regarding the sets before the calculating step; and
a specifying step of specifying the contact position by using the combination of the phase differences calculated in the calculating step and the information stored in the storing step.

8. A rotating machine including an abnormality detecting apparatus according to claim 1.

* * * * *